Nov. 20, 1951     D. F. LANGENWALTER     2,575,922
TEMPERATURE MEASURING DEVICE
Filed Nov. 28, 1950
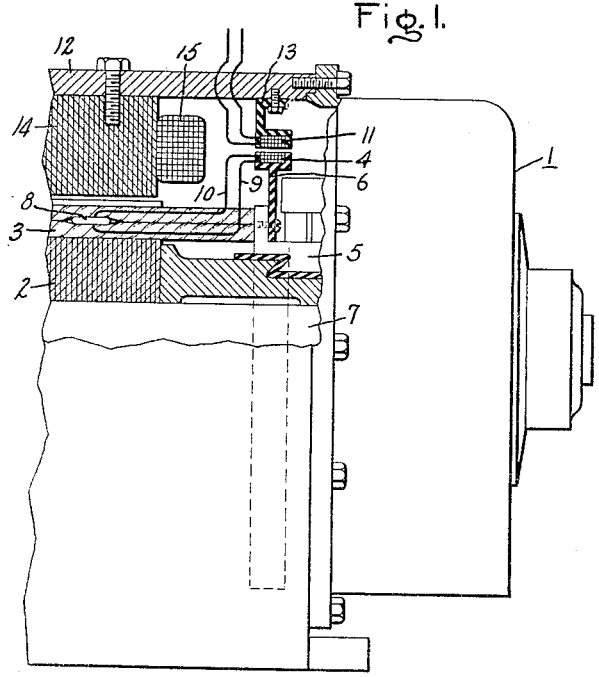
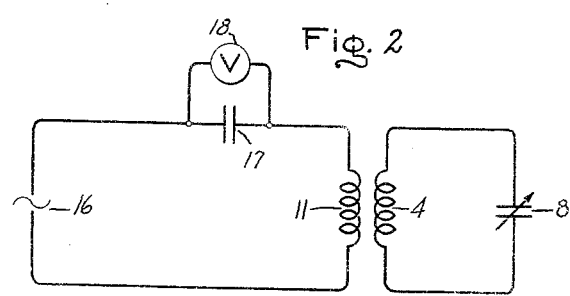
Inventor:
Daniel F. Langenwalter,
by Paul A. Frank
His Attorney.

Patented Nov. 20, 1951

2,575,922

UNITED STATES PATENT OFFICE 2,575,922

TEMPERATURE MEASURING DEVICE

Daniel F. Langenwalter, Schenectady, N. Y., assignor to General Electric Company, a corporation of New York Application November 28, 1950, Serial No. 197,955

2 Claims. (Cl. 73—351)

This invention relates to temperature measuring devices and more particularly to those devices for measuring temperatures inside the rotors of rotating machinery.

An object of this invention is to provide an accurate device for measuring temperatures in places which are generally inaccessible inside the rotors of rotating machinery.

A further object of this invention is to provide an accurate device which does not require the use of slip rings for measuring temperatures inside rotors.

In carrying out this invention, a temperature sensitive capacitor is embedded in the rotor of a machine at the point where temperature measurement is desired. Leads are brought out from the capacitor to a coil wound around the periphery of the rotor. A similar coil of greater radius is attached to the stator of the machine, spaced radially from the rotor coil. The coils are aligned so that the inductive coupling between them is affected very little or not at all by rotation of the rotor coil. The two coils, in effect, are an air core transformer. The impedance of the network formed by the capacitor and the coils, as measured at the terminals of the stationary stator coil, is a function of the capacitance of the temperature sensitive element. Since the capacitance of the temperature sensitive capacitor is dependent on the temperature at the point where it is mounted, the impedance of the network is then a function of the temperature at that point. By the use of a bridge circuit, an accurate measurement of the network impedance and, thus, of the temperature is obtained. Indicators directly showing the temperature for alarm and other controls are readily obtainable by the use of the aforementioned network plus a suitable electric circuit connected thereto. An example of a suitable circuit is described hereinafter.

For a better and more complete understanding of the invention, together with additional objects and advantages thereof, reference should now be had to the following specification and to the accompanying drawing in which:

Fig. 1 is a view partially in section of a dynamoelectric machine embodying the temperature measuring device of this invention; and Fig. 2 is a schematic diagram of a circuit, containing the network of this invention, for indicating temperature readings directly.

Referring to Fig. 1, a dynamoelectric machine 1, such for example as an electric motor having rotor laminations 2, and a rotor or armature winding 3, has a narrow annular electric winding or coil 4 spaced radially outward from and held in position around the periphery of commutator 5 by supporting member 6, coil 4 being coaxial with the motor shaft 7. A temperature sensitive capacitor 8, embedded in winding 3, is connected across coil 4 by leads 9 and 10. Temperature sensitive capacitor 8 contains a dielectric whose properties change with temperature, making the capacitance of capacitor 8 dependent on the temperature of the winding surrounding it.

Another narrow annular electric winding or coil 11 is attached to stator frame 12 of motor 1 by supporting member 13, coil 11 being coaxial with rotor shaft 7. Coil 11 is spaced radially outward from coil 4 with its principal plane coinciding with that of coil 4 and perpendicular to axis of rotation of the rotor, i. e., rotor shaft 7. Coil 11 is thereby inductively coupled with coil 4, the coupling being substantially unaffected by rotation of coil 4. Motor 1, in this example, is of the usual direct current type having several laminated stator poles with their associated windings, such as pole 14 and winding 15.

In the circuit of Fig. 2, capacitor 8 and coil 4 are connected to form a closed loop, while coil 11, a source 16 of alternating electric power, and an ordinary non-temperature sensitive capacitor 17 form a second closed loop. Coils 4 and 11 are inductively coupled, as hereinbefore mentioned, to form an inductive link between the two loops. A voltmeter 18 is connected across capacitor 17.

With motor 1 turning under load, the armature winding 3 heats up and the temperature sensitive capacitor 8 imbedded therein assumes the same temperature. The capacitance of capacitor 8, as heretofore set forth, varies with the temperature. Since the source voltage 16 and the remaining elements, coils 4 and 11, and capacitor 17, in the circuit remain at known constant values, the impedance of the circuit and the resultant current flow depend upon the capacitance of capacitor 8. As the current flow changes, the voltage drop across capacitor 17, which is indicated by voltmeter 18, changes. Then, since this voltage drop depends on the capacitance of capacitor 8, voltmeter 18 can be calibrated to indicate temperature directly. Alarm and other contacts can be placed on the voltmeter and actuated thereby.

Although this circuit gives a good direct indication of the temperature, a measurement of the temperature to a high degree of accuracy is best obtained by connecting a bridge across the terminals of stationary coil 11 and taking a reading of the impedance of the network composed of coils 4 and 11 and capacitor 8. Since the impedances of coils 4 and 11 are known, and the impedance reading of the network given by the bridge is extremely accurate, the capacitance of capacitor 8 and thereby of the temperature of winding 3 surrounding it, can be calculated with great accuracy. A calibration curve of temperature versus circuit impedance would be of great utility where it is decided to read winding temperatures frequently.

Temperature sensitive capacitors have a point of maximum dielectric constant known as the Curie point. Different dielectric materials have different Curie points. It is important that the dielectric material used in any application of this invention have a Curie point at least 20° C. below the minimum temperature to be measured. This is necessary in order that the effective temperature hysteresis, the variation of capacity following a fixed cycle of temperature, be minimized. The transition point below which there is a temperature hysteresis effect varies with different dielectric materials, but for known materials generally lies between its respective Curie point and the point 20° higher.

Although capacitor 8 is shown imbedded in winding 3, it is not meant to restrict the positioning of the capacitor to that location. It may be placed at any point, such as in the rotor laminations, at which the temperature is desired. The temperature may be measured in places which formerly were generally inaccessible, merely by proper positioning of the capacitor.

Moreover, rotor coil 4 need not be mounted adjacent to commutator 5 as shown, but may be mounted around the end turns of winding 3 or in other suitable positions, as desired. Of course, wherever the rotor coil is positioned, the stator coil must be mounted so that the inductive coupling between the two is not affected by rotation of the rotor. To avoid high hysteresis loss it is best to mount the coils where little or no iron will be in the path of the flux linking them.

The electrical machine described and illustrated herein was defined as a direct current motor. However, this invention is equally applicable to all types of electrical machines, whether motors or generators, direct current or alternating current. It can also be used in non-electrical rotating machinery.

Although in accordance with the provisions of the patent statutes, this invention is described as embodied in concrete form, and the principle thereof has been explained together with the best mode in which it is now contemplated applying that principle, it will be understood that the elements shown and illustrated are merely illustrative and that the invention is not limited thereto, since alterations and modifications will readily suggest themselves to persons skilled in the arts, without departing from the true spirit of this invention or from the scope of the appended claims.

What I claim as new and desire to secure by Letters Patent of the United States is:

1. In a device for measuring temperatures inside the rotor of a rotating machine, a capacitor having a capacitance variable in response to changes in temperature embedded within said rotor, a first electrical winding mounted on said rotor and connected electrically across said capacitor, a second electrical winding, means mounting said second electrical winding adjacent to said first electrical winding to provide an inductive coupling therebetween substantially unaffected by the rotation of said first winding, a pair of conductors for supplying a periodically varying voltage to said second winding and an electroresponsive indicating device electrically connected to said second winding responsive to the effective value of the current flowing in the circuit of said second winding.

2. In a device for measuring temperature inside the rotor of a rotating machine, a capacitor having a capacitance significantly variable with temperature embedded within said rotor, a first annular electrical winding positioned around the periphery of a portion of said rotor and secured thereto, said first annular winding being coaxial with the axis of rotation of said rotor and having its principal plane perpendicular thereto, said first annular winding connected electrically across said capacitor, a second annular electric winding, means mounting said second winding coaxially with said axis of rotation and surrounding said first winding in spaced relationship therewith and with its principal plane coinciding with the principal plane of said first winding to provide an inductive coupling between said windings substantially unaffected by rotation of said first annular winding, supply conductors for supplying a substantially constant periodically varying voltage to said second winding and a device for measuring variations in the effective value of current flowing in the circuit of said second winding resulting from variations in capacitance of said capacitor.

DANIEL F. LANGENWALTER.

No references cited.